United States Patent
Schmidt et al.

(10) Patent No.: US 9,500,284 B2
(45) Date of Patent: Nov. 22, 2016

(54) GATE VALVE

(71) Applicants: Stephen Schmidt, Zebulon, NC (US); Kenneth Douglas Neal, Clayton, NC (US)

(72) Inventors: Stephen Schmidt, Zebulon, NC (US); Kenneth Douglas Neal, Clayton, NC (US)

( * ) Notice: Subject to any disclaimer, the term of this patent is extended or adjusted under 35 U.S.C. 154(b) by 0 days.

(21) Appl. No.: 14/751,827

(22) Filed: Jun. 26, 2015

(65) Prior Publication Data
US 2016/0047488 A1 Feb. 18, 2016

Related U.S. Application Data

(60) Provisional application No. 62/038,449, filed on Aug. 18, 2014.

(51) Int. Cl.
*F16K 11/02* (2006.01)
*F16K 3/02* (2006.01)

(52) U.S. Cl.
CPC .................................. *F16K 3/0272* (2013.01)

(58) Field of Classification Search
CPC .................. Y10T 137/6072; Y10T 137/0514; F16K 3/0272; F16K 3/04; F16K 43/00
USPC ................. 137/315.26, 315.29, 316, 625.48, 137/625.49; 251/193, 194, 195, 326, 327
See application file for complete search history.

(56) References Cited

U.S. PATENT DOCUMENTS

| | | | | | |
|---|---|---|---|---|---|
| 2,732,170 | A | * | 1/1956 | Shand | F16K 3/0227 138/94.5 |
| 2,896,668 | A | * | 7/1959 | Aitken | F16K 3/06 138/44 |
| 4,425,806 | A | * | 1/1984 | Van Scoy | G01F 1/42 138/44 |
| 4,693,447 | A | * | 9/1987 | Perez | E03F 1/006 251/129.12 |
| 5,271,426 | A | * | 12/1993 | Clarkson | F16K 3/0281 137/375 |
| 5,370,149 | A | * | 12/1994 | Clarkson | F16K 3/0281 137/375 |
| 6,983,759 | B2 | * | 1/2006 | Maichel | F16K 3/12 137/315.29 |
| 7,309,057 | B2 | * | 12/2007 | Santiago | F16J 15/46 251/172 |

* cited by examiner

*Primary Examiner* — Mary McManmon
*Assistant Examiner* — Reinaldo Sanchez-Medina
(74) *Attorney, Agent, or Firm* — Coats & Bennett PLLC (57) ABSTRACT

A gate valve is provided with a flapper mechanism that is disposed in the main body of the valve and automatically works to seal and isolate the main body of the valve from a bonnet. The bonnet is isolated without any manual function or operation. When the flapper valve is in a closed position, the bonnet, gate and gate actuating mechanism can be removed from the gate valve body without isolating the gate valve. This enables the bonnet and associated components to be repaired or replaced while water or fluid under pressure continues to flow through the main body of the gate valve.

17 Claims, 6 Drawing Sheets

GATE VALVE

FIELD OF THE INVENTION

The present invention relates to gate valves.

BACKGROUND OF THE INVENTION

Gate valves typically comprise a main body having an aligned inlet and outlet allowing flow of water or other media. A bonnet assembly (positioned and situated vertically or horizontally) is secured to the main body generally between the inlet and outlet in manner that allows the inlet and outlet to be separated or isolated during the closure process. The bonnet houses an actuating mechanism for moving a gate or wedge up and down opening or closing off flow through the valve.

A significant problem or drawback with gate valves occurs when the gate valve fails. When the gate valve fails, it has to be isolated and taken offline. This results in a water service shutdown to surrounding homes and businesses. The valve must be cut out, removed and a new valve installed by use of couplings and spool pieces. Also, service disruption and current repair processes compromise the integrity of the distribution system and introduces the potential for contaminants to enter the system.

Therefore, there is a need for a gate valve design that enables the gate valve to remain in service even when the bonnet is removed, thus not disrupting service to customers and businesses.

SUMMARY OF THE INVENTION

The present invention relates to a gate valve having an internal flapper or flapper valve disposed in the main body of the gate valve that creates an isolating interface between the main body and the bonnet. This flapper valve automatically allows isolation between the main body and the bonnet assembly. The flapper valve functions to isolate the main body of the valve from the bonnet while allowing full flow thru the valve body while allowing removal of the bonnet for repair or replacement without a secondary action.

In one embodiment, the gate valve comprises a bonnet secured generally over a gate opening in the main body of the valve. The flapper valve is mounted in the main body adjacent the gate opening and moveable between open and a closed positions. As the gate moves towards the closed position to shut off flow through the main body of the valve, the gate passes through a gate opening formed in the main body adjacent the bonnet. The gate will engage the flapper valves and cause the flapper valve to move from its closed position, thereby opening the gate opening and allowing the gate to pass through the gate opening. The flapper valve, in one embodiment, is biased to the closed position. Thus, as the gate is moved from the closed position to the open position, the flapper valve will generally follow the gate until it reaches the closed position. When the flapper valve assumes the closed position, the gate is disposed outwardly of the flapper valve and a substantial portion of the gate is disposed in the bonnet. In one embodiment, the flapper valve is configured and disposed such that the liquid pressure in the main body tends to urge the flapper valve towards the closed position and, once in the closed position, the pressure within the main body of the gate valve tends to maintain the flapper valve closed.

In a further embodiment of the present invention, the gate valve comprises a main body having inlet and outlet openings that permit a fluid or a liquid to flow through the main body of the gate valve. A bonnet is detachably secured to the main body and extends therefrom. A gate is moveably mounted in the gate valve and there is a gate opening formed in the main body of the gate valve for permitting at least a portion of the gate to move between the bonnet and the main body. A flapper valve is moveably mounted in the main body for closing the gate opening and the flapper valve is moveable in response to the movement of the gate. An actuator is provided for moving the gate through the gate opening and between an open position and a closed position. The flapper valve is moved from the closed position by the movement of the gate which engages the flapper valve and pushes the flapper valve away from the closed position.

Other objects and advantages of the present invention will become apparent and obvious from a study of the following description and the accompanying drawings which are merely illustrative of such invention.

DESCRIPTION OF THE GATE VALVE

With further reference to the drawings, the gate valve of the present invention is shown therein and indicated generally by the numeral 10. Gate valve 10 comprises a main body indicated generally by the numeral 12 and a bonnet secured to the main body and indicated generally by the numeral 14. Bonnet 14 extends upwardly from the main body 12 shown in FIG. 1.

Figure 2A:
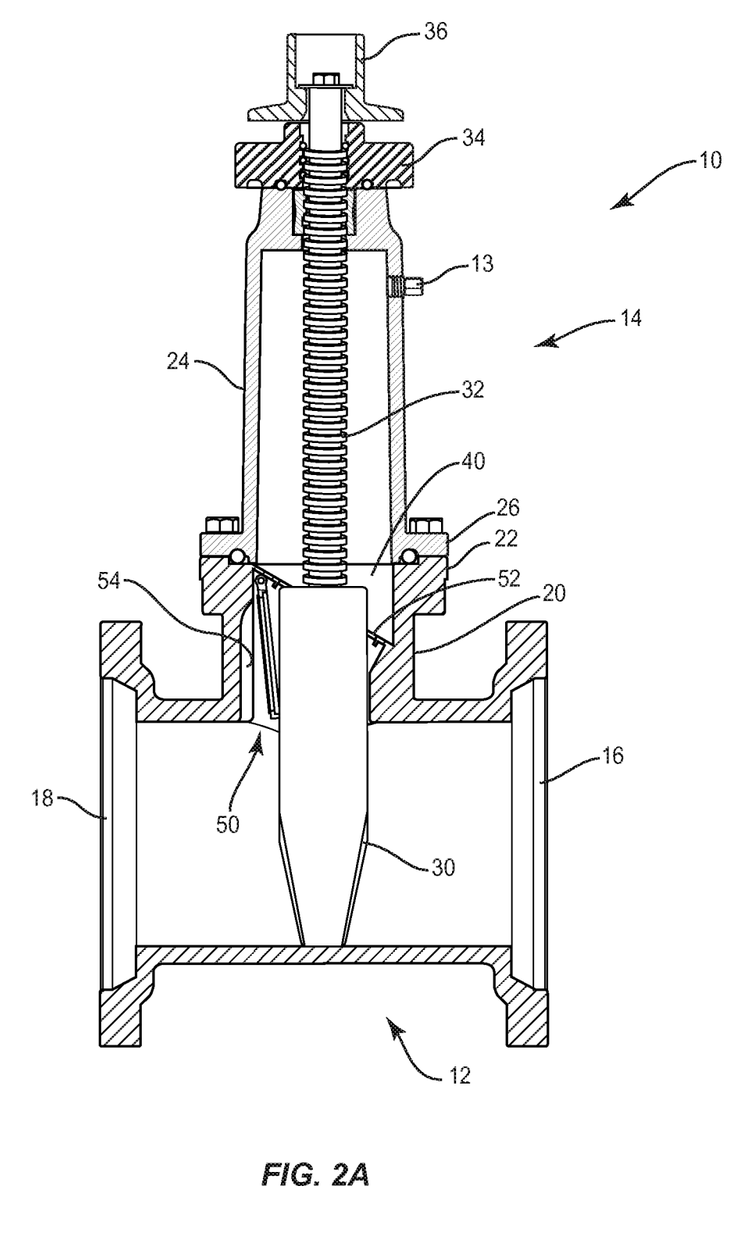
FIG. 2A is a sectional view of the gate valve showing the gate in the closed position.

Main body 12 includes a pair of opposed openings 16 and 18. Defined between the openings 16 and 18 is a throughbore or through-way, an inlet and an outlet, that permits water or liquid under pressure to pass through the main body 12. For purposes of illustration, opening 18, as shown in FIG. 2A, is an inlet opening and opening 16 is an outlet opening. Thus, in the exemplary embodiment shown in the drawings and discussed herein, water flowing through the gate valve 10 flows from left to right as viewed in FIG. 2A. It is appreciated that water could flow from right to left if desired. Main body 12 includes a center section 20 that is generally raised and disposed between the openings 16 and 18. Formed about the upper portion of the center section 20 is an upper flange 22. See FIG. 2A for example.

Figure 1:
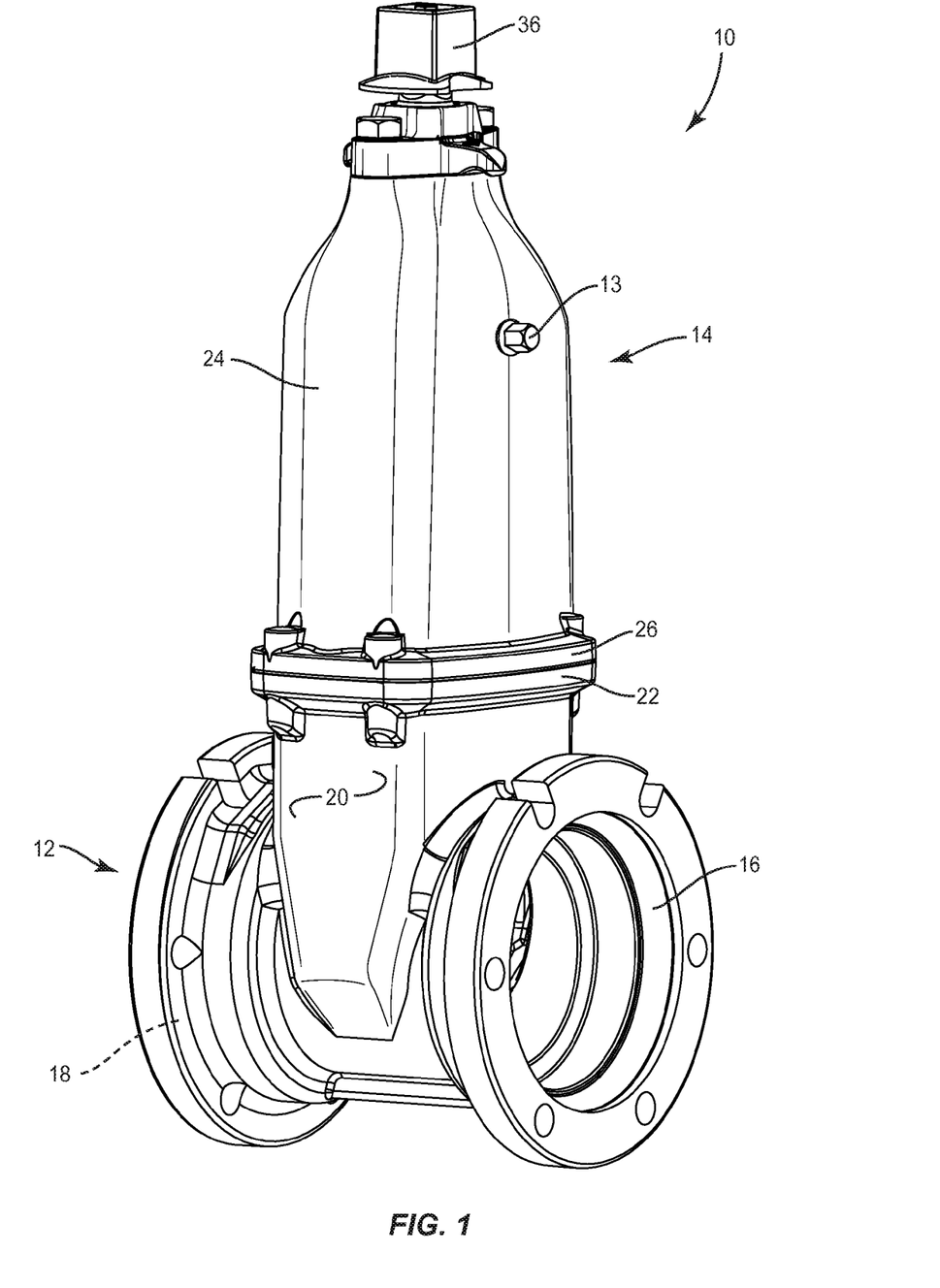
FIG. 1 is a perspective view of the gate valve of the present invention.

Bonnet 14 is secured to the main body 12 of the gate valve 10 and, as viewed in FIGS. 1 and 2A, for example, the bonnet extends upwardly from the main body. Bonnet 14 includes a housing 24. Formed about the lower edge of the housing 24 is a housing flange 26. Bonnet 14 is secured to the main body 12 by securing the upper flange 22 of the main body to the housing flange 26 and securing the bonnet to the main body by extending a series of bolts through the respective flanges 22 and 26. The housing 24 of the bonnet includes a threaded bore and a threaded plug 13 secured in the threaded bore. See FIG. 2A. Plug 13 provides a way to assure that the pressure in the bonnet 14 is relieved before removing the bonnet. It may also be used as a chemical injection point, as is frequently needed in treatment plant valves.

Figure 2B:
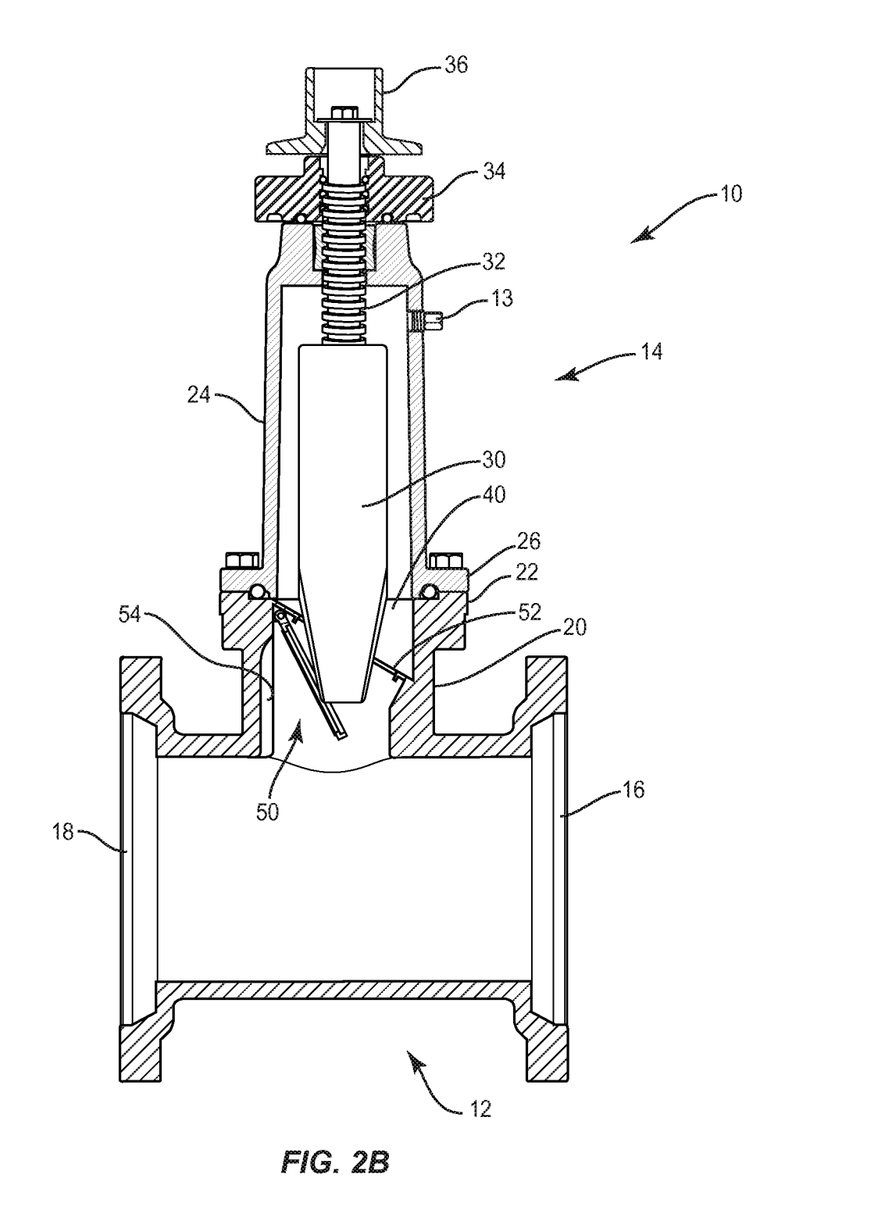
FIG. 2B is a sectional view of the gate valve showing the gate in an intermediate position.
Figure 2C:
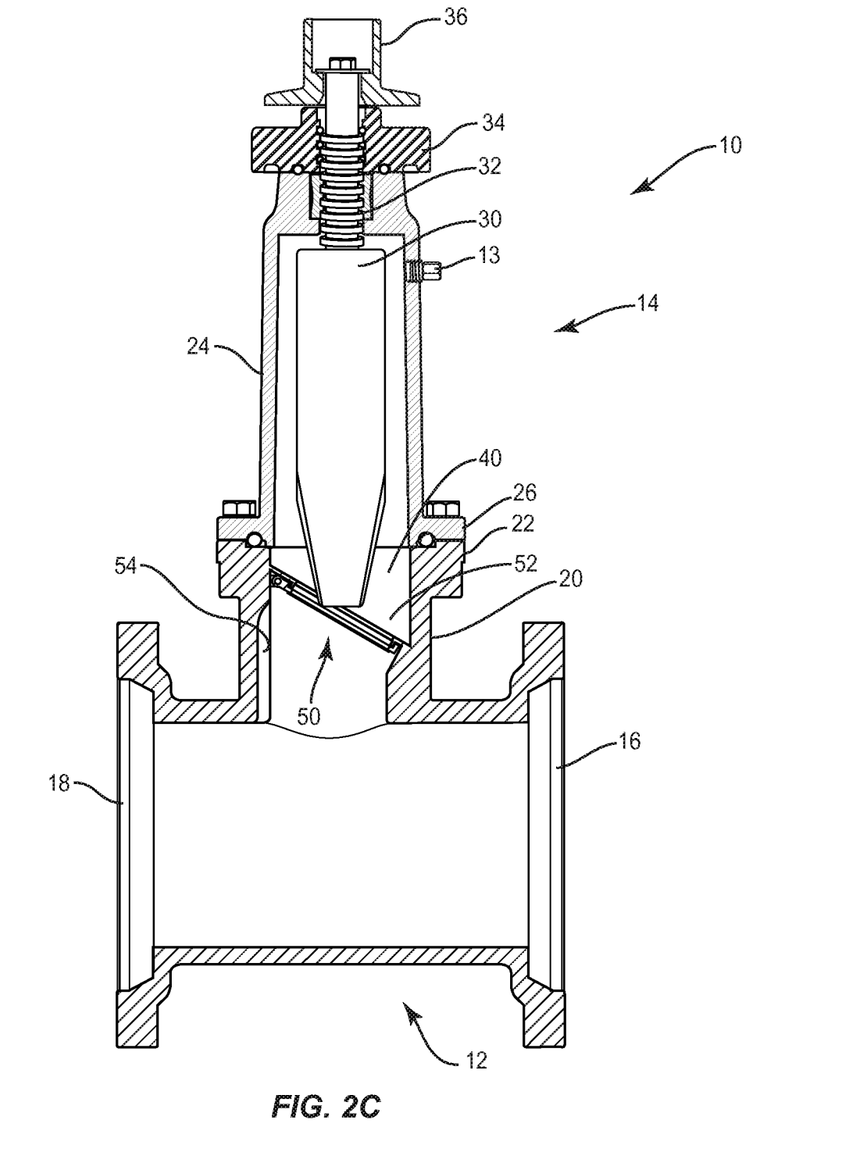
FIG. 2C is a sectional view of the gate valve showing the gate in an open position.

Disposed in the gate valve 10 is a gate or wedge 30. The function of the gate 30 is to close the through-way formed in the main body 12 of the gate valve 10. In FIG. 2A, the gate 30 is disposed in a closed position. In this position, water is precluded from flowing into opening 18, through the through-bore and out the outlet opening 16. As will be discussed later, the gate 30 is designed to be retracted upwardly, to an open position which is shown in FIG. 2C. In the normal open position, water or other fluid can flow unrestricted through the through-way in the main body 12 of the gate valve.

Gate 30 can be constructed of various suitable materials and can assume various shapes that are configured to close the through-way when the gate is in the closed position. Generally, in one embodiment, the gate 30 includes a slightly compliant outer portion for engaging portions of the valve 10 in the through-way area so as to create an effective seal. Details of the wedge structure itself are not dealt with herein in detail because the structure of the wedge per se is not material to the present invention and the structure and design of suitable gates are well known and appreciated by those skilled in the art.

As discussed above, the gate 30 moves up and down between closed and open positions. Gate valve 10 is provided with a gate actuating mechanism for driving the gate 30 upwardly and downwardly within the gate valve 10. This gate actuating mechanism, in the embodiment illustrated herein, comprises a threaded elongated shaft 32 that is supported and rotatively held in the bonnet 14. In particular, the threaded shaft 32 is supported in a threaded collar 34 that is disposed on an upper portion of the bonnet 14. Gate 30 includes an elongated hollow bore (not shown) that extends through a substantial portion of the gate. A portion of this hollow bore formed in the gate includes threads that are engaged with the threaded shaft 32. In addition, formed on the upper end of the bonnet 14 is a driver 36. Driver 36 is connected to shaft 32 and is configured to receive a turning or driving tool. Thus, by rotating the driver 36, the elongated shaft 32 is rotated within the bonnet 14. Rotation of the elongate shaft 32 results in the gate 30 moving upwardly and downwardly, depending on the direction of rotation of the shaft, as the shaft is rotated. This enables gate 32 to be moved back and forth between the closed position (FIG. 2A) and the open position (FIG. 2C).

Figure 3:
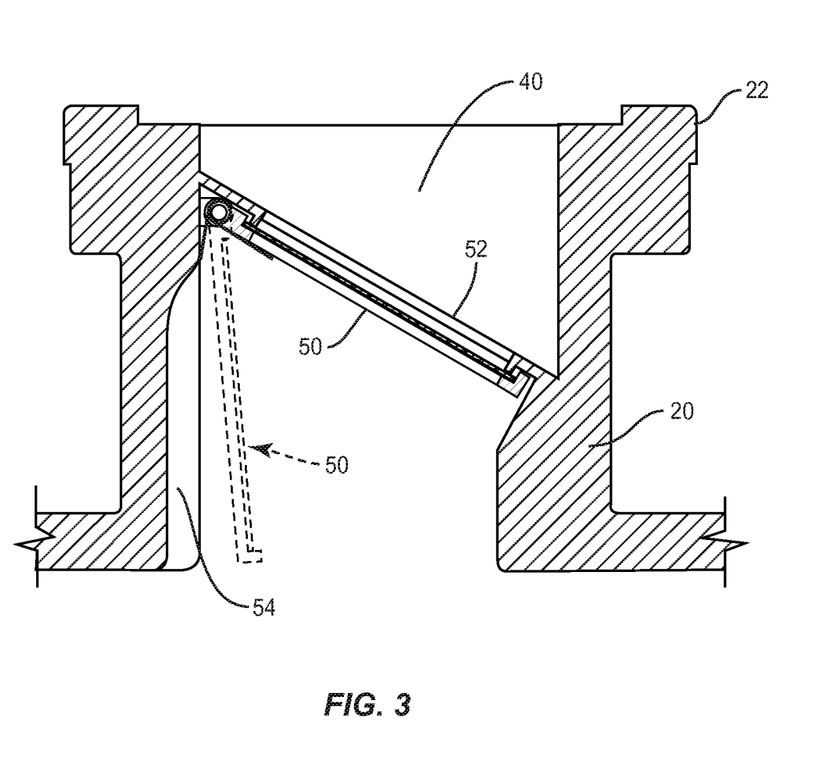
FIG. 3 is a fragmentary enlarged sectional view showing the flapper valve in a closed position (full lines) and in an open position (dotted lines).

Formed in the main body 12 is gate opening 40. See FIG. 3. The function of the gate opening 40 is to allow the gate 30 to pass from the interior of the bonnet 14 into the main body 12 and vice versa. Gate valve 10 is provided with a valve for opening and closing the gate opening 40. That is when the gate 30 is deployed to its closed position as shown in FIG. 2A, the valve associated with the gate opening 40 is open, permitting the gate to pass through the gate opening. However, when the gate 30 is elevated and disposed in the interior of the bonnet 14 (the open position), the valve is designed to close the gate opening 40. Thus this permits bonnet 14, gate 30, and the gate actuating mechanism to be removed entirely from the main body 12 of the valve while still permitting water or fluid to flow through the through-way of the gate valve. This permits the bonnet, gate and gate actuating mechanism to be repaired or serviced without taking the gate valve 10 offline.

The gate opening 40 forms a part of a passageway that extends outwardly from the main body of the gate valve. Note in FIG. 2C where the passageway is effectively formed by the central portion 20 of the main body. Note that the flapper valve 50 is disposed at an angle within the passageway. That is, the passageway, as viewed in FIG. 2C, extends generally upwardly and includes an axis. The flapper valve 50 is disposed at an angle to this axis.

The valve associated with the gate opening 40 is a flapper or flapper valve indicated generally by the numeral 50. In FIG. 2A, the flapper 50 is open. In FIG. 2C and in full lines in FIG. 3, the flapper 50 is in a closed position. In one embodiment, the flapper 50 is designed to be biased towards the closed position.

In the embodiment illustrated herein, there is provided an angled seat 52 for abutting or engaging the flapper 50 when the flapper assumes the closed position. Note in FIG. 3 where in this embodiment the flapper seat 52 is inclined generally downwardly from the left side of the gate opening 40 to the right side. In one example, the flapper seat 52 is cast in the main body 12 about the upper portion of the center section 20.

Flapper 50 can be constructed of various suitable materials and can assume various shapes. In addition, flapper 50 can be actuated or biased in various ways. In any event, the design and actuation of the flapper 50 should be such that it closes gate opening 40 when the gate is retracted to its open position shown in FIG. 2C. In addition, the flapper 50 is designed such that it will easily open as the gate is moved downwardly from its open position towards the closed position. In this case, the lower portion of the gate 30 is designed to engage the flapper 50 and to cause the flapper to rotate clockwise as shown in FIG. 2B to an open position that allows the gate to move downwardly through the center section 20 of the gate valve 10 towards the closed position.

Figure 4:
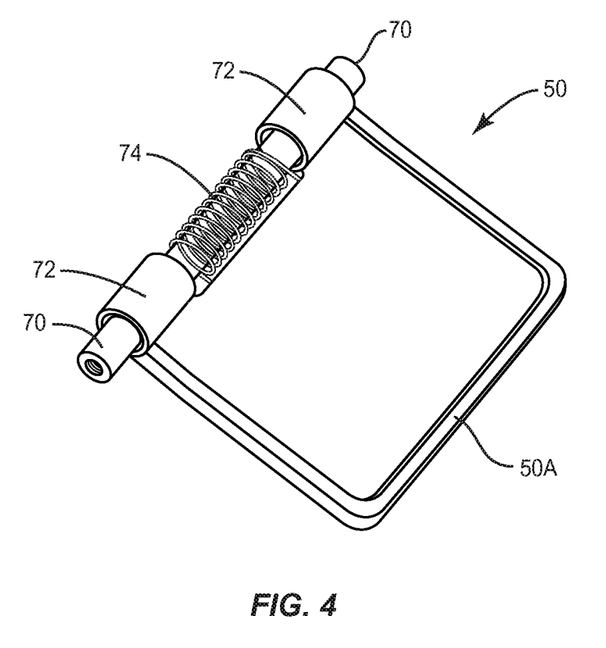
FIG. 4 is a perspective view of one embodiment for the flapper valve along with the actuating mechanism for the same.
Figure 5:
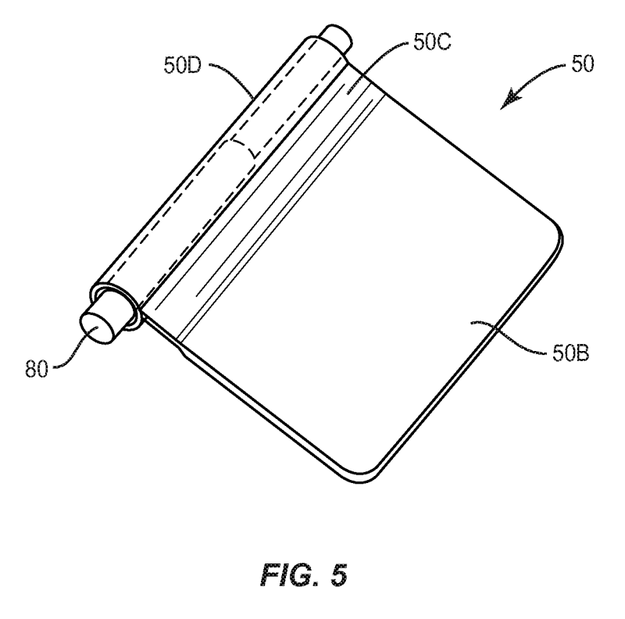
FIG. 5 is a view of an alternative flapper design.

Two exemplary designs for the flapper 50 are shown in FIGS. 4 and 5. The core of the flapper 50 in each design can be constructed of various suitable materials, such as metals, plastic, etc. FIG. 4 shows a rubber or resilient edge 50A that surrounds a metal core. This resilient edge 50A will engage and seal against the flapper seat 52 when the flapper is in the closed position. FIG. 5 depicts a flapper 50 that includes a resilient rubber-type casing 50B that encapsulates a metal core.

Each of the flapper designs disclosed herein includes a mechanism for biasing the flapper towards a closed position. In the FIG. 4 embodiment, the flapper 50 includes a mounting shaft 70 and a pair of sleeves 72 that are connected to the flapper 50. The sleeves 72 and flapper 50 rotate about the axis of the mounting shaft 70. There is provided a torsional spring 74 connected to the flapper. In the embodiment illustrated in FIG. 4, the torsional spring is connected in such a way that it provides a counterclockwise bias to the flapper or as viewed in FIG. 3. In particular, one end of the torsional spring 74 is connected to the shaft 70 and the other end of the torsional spring is connected to the flapper 50. This provides the biasing action for urging the flapper towards a closed position.

As the gate 30 moves up and down between the open and closed positions, it engages or contacts the flapper 50. The flapper 50 and gate 30 are designed to minimize or reduce friction between the two as the gate moves up and down past the flapper. There are various approaches to reducing the friction between the gate and flapper. One approach includes providing a low friction metal on the side portion of the gate 30 that engages the flapper 50. Another option is to provide a low friction material on both engaging surfaces.

In one embodiment, the upper portion of the main body 12 is designed to use fluid pressure in the main body to urge the flapper 50 closed and to maintain the flapper closed. Note in FIGS. 2C and 3, for example, where a scoop 54 is formed into the interior side wall of the center section 20. Scoop 54 is designed to urge water or fluid in the main body 12 against the lower portion of the flapper 50. As viewed in FIG. 3, it is seen that the scoop 54 will cause the water or fluid that is under pressure in the main body 12 to be urged towards the flapper 50 and to hold the same in a closed position.

Turning to the FIG. 5 embodiment, the flapper 50 is mounted on a spring loaded mounting shaft 80. In this embodiment, this is a two-piece construction that includes an internal spring that allows two cylindrical sections that form the shaft 80 to be collapsed such that it can be snapped into holding ports formed in the main body 12 of the valve. The flapper 50, in this embodiment, includes three sections: an outer rigid section 50B, a cylindrical section 50D that is fixed around the spring loaded mounting shaft 80, and an intermediate flexible section 50C that is designed to flex and exhibit memory.

In use, the flapper 50 and mounting shaft 80 is secured in the main body 12 of the gate valve 10 such that the flapper 50 normally assumes the closed position and abuts against flapper seat 52. When the gate 30 is deployed and extended downwardly, the gate will engage the rigid section 50B of the flapper 50. This will result in the flexible section 50C flexing and permitting the rigid section 50B to rotate clockwise as viewed in FIG. 3, for example. When the gate 30 is raised from the closed position towards the open position, the flexible section 50C because of its internal memory, will flex and return to its normal position which will cause the entire flapper, including rigid section 50B, to abut against the flapper seat 52 and seal the opening defined by the flapper seat.

From the foregoing specification and discussion, it is seen that by turning the driver 36 that the gate 30 can be moved up and down between the closed and open positions. When the gate 30 is in the upper open position shown in FIG. 2C, it follows that the flapper 50 is closed against the flapper seat 52 and effectively seals the main body 12 of the gate valve 10 from the bonnet 14. When the gate 30 is in the open position, the bonnet 14, as well as the gate 30 and its actuating mechanism can be removed from the gate valve 10, without having to take the gate valve offline. Expressed in another way, the bonnet 14 and associated structure can be completely removed from the gate valve 10 for repair or service while water passes through the main body between the respective openings 16 and 18. The flapper 50 can be constructed of various materials. In one example, the flapper 50 may comprise a flat piece of Ductile Iron encased in a rubber-type compound that is attached to the main body with non-corrosive screws The modular ability of the gate valve also allows for interchangeable bonnet structures, such as an air release bonnet, a flow measurement bonnet, a sample point bonnet, etc. When a traditional gate valve is only used for rare shutdowns, the valve can be converted to an air release function by attaching an air release bonnet. The same applies for a flow measurement bonnet, etc. These functions are used daily and provide better use than a single function device. When the valve requires to be shut down, the air release bonnet could be removed and a conventional gate valve bonnet can be installed, and then the line can be shut off.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A gate valve comprising:
   a main body having spaced apart inlet and outlet openings and a through-way formed between the inlet and outlet openings through which water or liquid flows;
   a gate opening formed in the main body of the gate valve;
   a bonnet removably mounted to the main body and generally aligned with the gate opening, the bonnet extending from the main body of the gate valve;
   a moveable gate disposed in the gate valve;
   an actuator operatively connected to the gate for moving the gate between a closed position and an open position;
   in the closed position, the gate is disposed in the main body between the inlet and outlet openings and generally prevents the flow of water or liquid through the main body of the gate valve;
   in the open position, the gate assumes a position at least partially in the bonnet and above at least a portion of the gate opening;
   an automatic flapper valve moveably connected to the main body of the gate valve adjacent the gate opening and operative to close the gate opening, the flapper valve being moveable between open and closed positions wherein in the closed position the flapper valve closes the gate opening;
   wherein the flapper valve is responsive to the movement of the gate and wherein the flapper valve and gate are configured and positioned relative to each other such that movement of the gate from the open position toward the closed position results in the flapper valve moving to the open position and wherein movement of the gate from the closed position to the open position results in the flapper valve assuming the closed position;
   wherein the flapper valve is wholly supported by the main body independent of the bonnet and remains connected to the main body when the bonnet is removed from the main body;
   wherein the flapper valve is spaced from the bonnet and does not engage any portion of the bonnet;
   wherein when the bonnet is removed from the main body, the flapper valve automatically assumes the closed position and closes the gate opening; and
   wherein the main body, bonnet, and flapper valve are configured such that when the bonnet is removed from the main body, the main body is operable to transmit water or liquid through the main body without the water or liquid exiting the main body via the gate opening.

2. The gate valve of claim 1 wherein the flapper valve is biased to assume the closed position; and wherein the gate includes a terminal end that engages the flapper valve and causes the flapper valve to move as the gate moves towards the closed position.

3. The gate valve of claim 1 wherein the gate opening is formed by a gate passageway that forms a part of the main body of the gate valve and which connects to the bonnet and wherein the flapper valve, when closed, assumes an inclined position in the gate passageway.

4. The gate valve of claim 3 wherein the gate passageway includes an outer flange and wherein the bonnet includes a flange and wherein the outer flange and the flange of the bonnet are connected together such that the bonnet aligns with the gate passageway.

5. The gate valve of claim 1 wherein the flapper valve is pivotally mounted and swings about an axis adjacent the gate opening.

6. The gate valve of claim 5 wherein the flapper valve in the closed position is disposed at an angle across the gate opening and wherein, in the closed position, the flapper valve engages a stop that positions the flapper valve in the closed position.

7. The gate valve of claim 1 wherein the flapper valve is configured such that when the flapper valve assumes the closed position, liquid pressure in the main body assists in maintaining the flapper valve in the closed position.

8. The gate valve of claim 1 wherein there is provided a central support that extends outwardly from the main body and forms an open passageway that includes the gate opening;
the central support including an outer flange;
wherein the bonnet is bolted to the outer flange of the central support and extends outwardly therefrom; and
wherein the flapper valve is pivotally connected to a wall of the open passageway and moves therein between the open and closed positions.

9. The gate valve of claim 8 wherein there is provided an angled seat formed in the open passageway and wherein, in the closed position, the flapper valve engages the angled seat and is disposed in the open passageway at an angle relative to an axis of the open passageway.

10. The gate valve of claim 1 wherein the flapper valve automatically assumes the closed position in response to the bonnet being removed from the main body.

11. The gate valve of claim 1 wherein the flapper valve is configured relative to the main body such that when the bonnet is removed from the main body and the flapper valve in the closed position, water or liquid pressure in the main body urges the flapper valve toward the closed position.

12. The gate valve of claim 1 wherein the main body comprises a single piece and wherein the bonnet includes a single piece;
a passageway forming a part of the main body and extending into engagement with the bonnet and wherein the passageway includes a first flange;
wherein the bonnet includes a second flange;
a series of bolts connected through the flanges, for connecting the bonnet to the main body; and
wherein the flapper valve is moveably mounted in the passageway.

13. A gate valve comprising:
a main body having inlet and outlet openings that permit a liquid to flow through the main body of the gate valve;
a bonnet removably connected to the main body and extending from the main body;
a gate moveably mounted in the gate valve;
a gate opening formed in the main body of the gate valve for permitting at least a portion of the gate to move between the bonnet and the main body;
a flapper valve moveably connected to the main body for closing the gate opening and wherein the flapper valve is moveable in response to the movement of the gate;
wherein the flapper valve and gate are positioned such that the movement of the gate towards the closed position results in the gate contacting the flapper valve and pushing the flapper valve away from the closed position; and wherein the flapper valve is biased towards the closed position and wherein, as the gate moves towards the open position, the flapper valve follows the gate and moves towards the closed position;
an actuator for moving the gate through the gate opening and between an open position and a closed position and wherein the flapper valve is moved from the closed position by the movement of the gate which engages the flapper valve and pushes the flapper valve away from the closed position;
wherein the flapper valve is supported in the gate valve independent of the bonnet and wherein the flapper valve remains moveably connected to the main body when the bonnet is removed from the main body; and
wherein the bonnet, main body and flapper valve are configured such that when the bonnet is removed from the main body, the flapper valve assumes the closed position and closes the gate opening and the main body is operative to transmit liquid through the main body without the liquid exiting the main body via the gate opening.

14. The gate valve of claim 13 wherein the flapper valve is disposed at an angle with respect to the longitudinal axis of the gate.

15. The gate valve of claim 13 wherein the gate opening is formed in a passageway that forms a part of the main body at the gate valve; wherein the flapper valve is disposed at an angle to an axis of the passageway and wherein the flapper valve is biased to assume the closed position which closes the passageway; and wherein, in the closed position, the flapper valve is oriented with respect to the main body such that liquid pressure in the main body assists in maintaining the flapper valve in the closed position.

16. The gate valve of claim 15 wherein the gate includes a terminal end that extends at least slightly into the passageway when the gate assumes an open position and wherein, in the open position, at least a portion of the gate is disposed in the bonnet.

17. The gate valve of claim 13 wherein the main body includes a scoop area formed in a portion of a wall structure that forms a part of the main body, and wherein the scoop area is disposed adjacent the flapper valve and situated such that the scoop area tends to direct liquid flowing through the main body towards the flapper valve such that the liquid flowing in the main body tends to assist in maintaining the flapper valve in the closed position.

* * * * *